Nov. 7, 1967 D. F. WOLFE 3,351,950

INFORMATION STORING APPARATUS

Filed April 12, 1965 2 Sheets-Sheet 1

INVENTOR.
DAVID F. WOLFE

*INVENTOR.*
DAVID F. WOLFE

United States Patent Office 3,351,950
Patented Nov. 7, 1967

3,351,950

INFORMATION STORING APPARATUS

David F. Wolfe, New York, N.Y., assignor to Record-A-Punch Corporation, Carlstadt, N.J., a corporation of New Jersey Filed Apr. 12, 1965, Ser. No. 447,488
3 Claims. (Cl. 346—104)

This invention relates to information storing and handling apparatus and, particularly, to apparatus of the type using punch cards for storing information.

At the present time, there are many instances in industry and in the sciences where punch cards are used to collect and store units of information. One typical application for such cards is in the field of public opinion surveys. In such surveys, generally, a worker devises a series of questions which are used by a poll-taker in the field. After the desired interviews have been held, the information gathered is entered in punch cards in coded form and is then processed and studied as required. This procedure is time-consuming and generally not efficient. However, at the present time, there is no apparatus available which is portable, can handle relatively large quantities of information, can be used easily to enter units of information in a punch card, and can monitor or read back entered information, if desired.

Accordingly, the principles and objects of the present invention are concerned with improved apparatus for handling units of information and for entering and storing units of information in a punch card, the apparatus also being adapted to permit constant monitoring and reading back of stored information.

Briefly, the apparatus of the invention includes, as a basic information coding unit, one or more master information code cards arranged in operative relation with a punch card in which information is adapted to be entered and stored. Each master code card includes a plurality of perforations, each of which represents and is associated with a unit of information. Each unit of information in the master code card is adapted to be entered in the punch card by piercing the punch card in a position corresponding to the position of the appropriate hole in the master code card. This operation is performed most conveniently by placing the master code card and the punch card in operative relation with each other, preferably with one overlying the other in proper alignment. A hole formed in the punch card enters a unit of information in the punch card.

The apparatus of the invention also permits (1) to utilize a plurality of master code cards, each carrying information, and (2) to enter information from each of the master code cards in a single punch card. This is achieved, generally, by arranging for each master code card and its information units to have a different spatial relationship with respect to the punch card in which information units are entered.

The apparatus of the invention also includes various arrangements for handling a relatively large number of master code cards and means for facilitating the reading back of information entered in a punch card.

The various features of the invention are described in greater detail below by reference to the drawing wherein.

Figure 1:
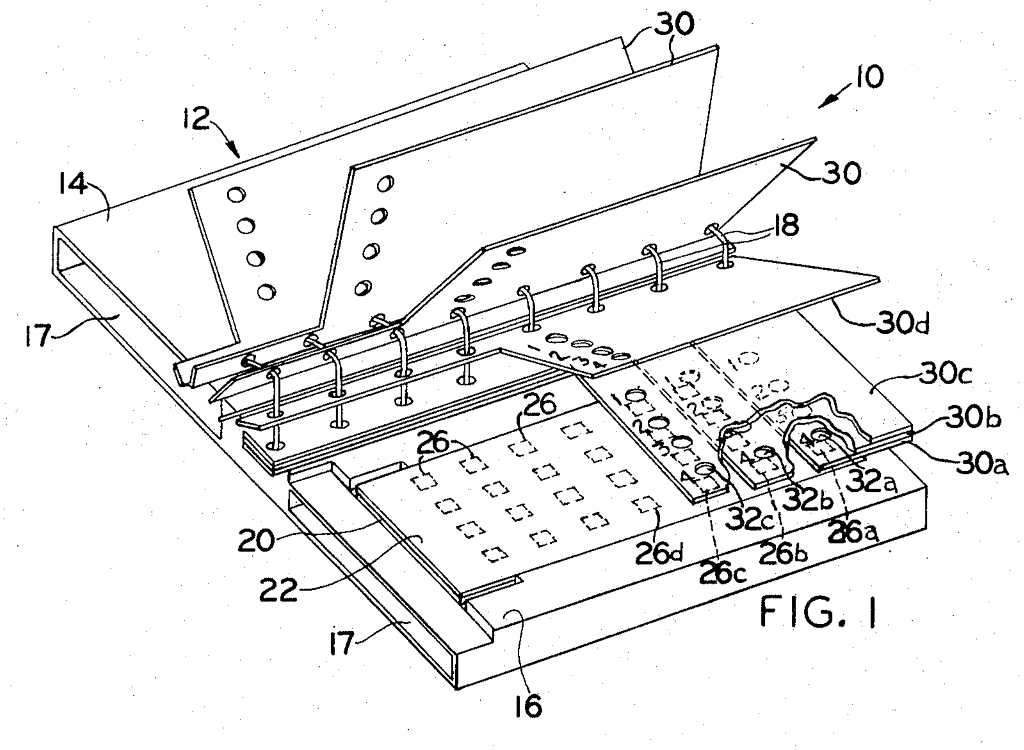
FIG. 1 is a perspective view, partly in section, of apparatus embodying the invention.

Information storing apparatus 10 embodying the invention comprises a two-part carrier 12 which includes a first part 14 which is in the nature of a tray and an adjacent part 16 which is in the nature of a tray. If desired, the carrier 12 may be provided with storage areas beneath each tray as shown at 17, for example. The carrier 12 is provided with a plurality of ring-type holders 18 which extend across the width of the carrier between the two trays. The rings 18 hold in place the master code information cards which are described in detail below. The second tray 16 supports, in order, a layer 20 of a relatively soft, pliable material such as rubber or the like which facilitates a card-perforating operation, and a blank punch card 22 in which information units are to be entered. The layer 20 and card 22 are disposed generally horizontally on tray 16.

It is to be understood in the following description of the invention that information units entered in the punch card and provided in the master code cards to be described may be positioned according to any suitable pattern which achieves the desired purpose. For purposes of illustration, the information units are arranged in columns and are so shown and described. Accordingly, the blank punch card 22 in which information is to be entered is provided with a plurality of columns of scored areas 26, with one column being provided for and corresponding to a column of information units on each master code card to be described. The scored areas are of any suitable shape, and they are adapted to be readily punched out of the card 22. The scored areas in each column may be numbered or identified in any suitable fashion, or they need not be identified at all on the card 22 itself.

The apparatus 10 includes and carries a stack of cards 30 which are the master code cards of the invention. The master cards 30 are secured to the rings 18 by means of suitable holes along one edge, and they are movable on the rings in known fashion. Each card 30 carries its own column of units of information which are available to be entered in the punch card 22. Each unit of information is represented by a perforation 32 in the card, and each perforation preferably carries an identifying numeral or other character. In order to facilitate, the punching operation, the perforations 32 are of comparatively small diameter. The master cards are of any suitable width, but each is a different length, with the lengths of the cards in the stack increasing from bottom to top in a staircase-type arrangement. Thus, assuming that the stack of cards is supported on tray 16, the bottommost card **30*a* is the shortest and has perforations 32*a* aligned with a column of scored areas 26*a* in the punch card 22. The next card 30*b* is longer than card 30*a* and extends beyond the edge of card 30*a* and has perforations 32*b* aligned with a column of scored areas 26*b* in card 22. The third card 30*c* is longer than 30*b* and extends beyond it and has perforations 32*c* aligned with the next column of scored areas 26*c*. Similarly, card 30*d* has perforations aligned with the next column of scored areas 26*d*. It is clear that any convenient number of master code cards 30** may be provided in the stack.

The units of information carried by the master code cards and represented by the perforations 32 may comprise questions, numerical quantities, or the like as those skilled in the art will understand. In addition, each master code card may carry more than one column of units of information to be entered in a punch card.

In using the apparatus of the invention 10 and assuming that all of the master code cards 30 are to be used, initially all of the cards are pivoted to the rear on the rings 18 so that the stack of cards is disposed on tray portion 14 of the carrier 12. A blank punch card 22 to be perforated and thus provided with units of information is placed on support layer 20, and the first and shortest master code card 30*a* is pivoted forwardly so that it overlays the blank punch card 22 with its perforations 32*a* aligned with the column of scored areas 26*a* in the punch card.

The desired units of information to be entered in the card 22 are entered therein by pushing a stylus or the like (not shown) into the proper perforations 32*a* in master card 30*a* and through the corresponding scored areas 26*a* in card 22 positioned thereunder. The stylus is guided by the small-diameter perforations 32. Next, card 30*b* is moved into position over card 30*a* with its perforations 32*b* aligned with scored areas 26*b* in card 22. The desired information is entered by perforating selected ones of the scored areas 26*b*. Similarly, information from some or all of the other cards 30 may be entered in punch card 22. The same procedure may be repeated with fresh punch cards 22.

Figure 2:
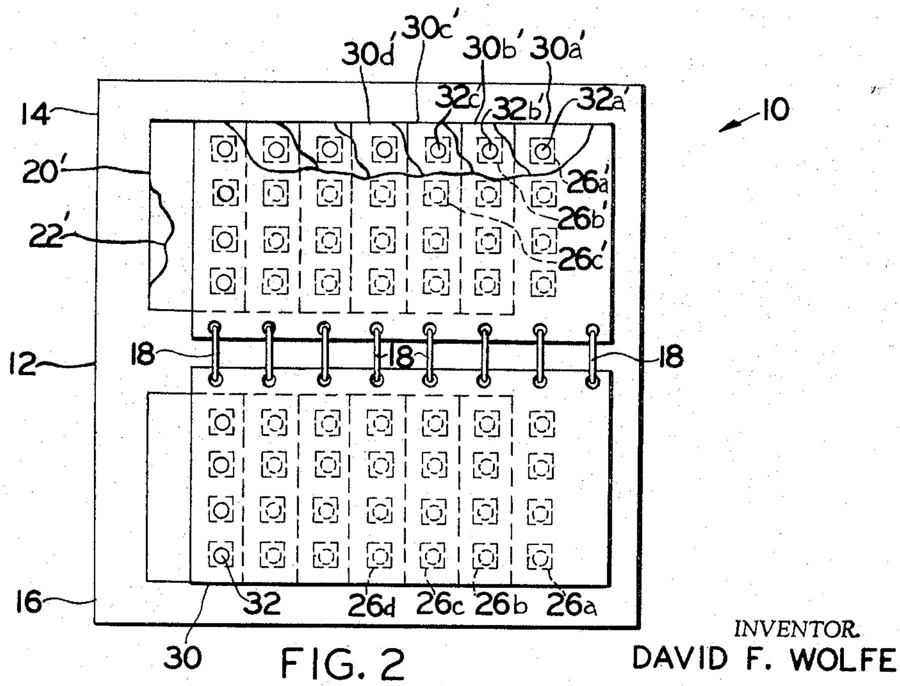
FIG. 2 is a plan view, partly in section, of the apparatus of FIG. 1 modified to increase its capacity.

The card-carrying capacity and information-handling capacity of the apparatus 10 may be increased in the following manner as shown in FIG. 2. Referring to FIG. 2, the desired increase in achieved by providing on the tray portion 14 of carrier 12 an assembly of parts as on tray 16, including, in order, a resilient layer 20′ and a blank punch card 22′ having scored areas 26′. A set of code cards 30′ similar to cards 30 and adapted to be used with punch cards 22′ is also provided. Cards 30′ have columns of perforated information units 32′. The stack of cards 30′ is positioned initially on the stack of cards 30, with the longest card 30′ on the bottom and the cards decreasing in length from bottom to top. The shortest card 30*a*′ is on top, the next longer card 30*b*′ is next below, etc.

In using this second set of cards 30′, the first and shortest card 30*a*′ is turned over so that it overlays the punch card 22′, with its perforations 32*a*′ aligned with the first column of scored areas 26*a*′ of card 22′. Card 30*a*′ is shown schematically in this position by means of dash lines. After the desired information has been entered in card 22′ by the removal of selected scored areas 26*a*′, the next longer card 30*b*′ is turned over so that its perforations 32*b*′ are positioned over the next column of scored areas 26*b*′, and the desired information is entered. In this way, each card 30′ may be placed in operative position, and the information in each may be entered in the appropriate column of scored areas in card 22′.

Figure 3:
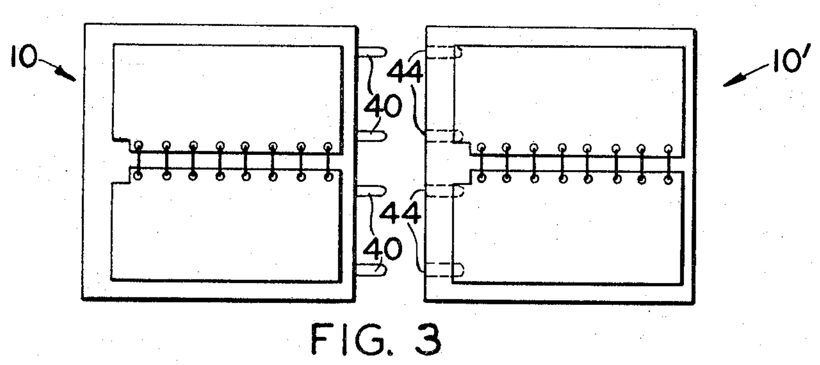
FIG. 3 is a plan view of another modification of the invention.

In another modification of the invention shown in FIG. 3, the capacity of the apparatus of the invention is increased by coupling a two-part carrier 10′, which may be identical to carrier 10, to a portion of the carrier 10. Thus, for example, the side of carrier 10 may be provided with pins 40 which are adapted to be inserted in apertures 44 in an abutting side of carrier 10′. Other means for the connection of carriers 10 and 10′ may also be employed.

Figure 4:
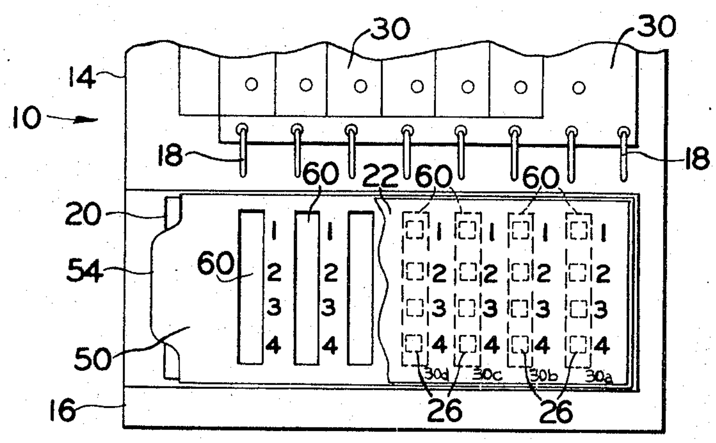
FIG. 4 is a plan view of still another modification of the invention.

The utility of the invention may be enhanced by providing means for permitting constant monitoring or reading back at will of information entered in a punch card. According to one embodiment of the invention shown in FIG. 4, this means comprises an auxiliary card 50 of plastic, metal, or cardboard, or paper of a color different from the color of the other cards employed with the apparatus 10. The auxiliary card 50 is substantially of the same size and shape as the blank punch cards 22, and it is adapted to lie between the resilient sheet 20 and the punch card 22 in the tray 16 or tray 14. The auxiliary card 50 is adapted to be operated by being moved laterally to the left as seen in FIG. 4, and, for this purpose, it includes a tab 54 or the like, by which it may be moved by the operator. The card 50 is provided with columns of numerals or other suitable indicia corresponding in number to the number of columns of scored areas 26 in the punch cards 22. Between each row of numerals, the card 50 is slotted as at 60, with the slots 60 extending across substantially the entire width of the auxiliary card. When the auxiliary card 50 is in its position of non-use in the tray 16, that is, during the time when information is being entered in the punch card, the slots 60 are aligned with the columns of scored areas 26 on the punch card 22.

In addition, auxiliary card 50 includes means for use in registering each column of numerals it carries with the proper column of scored areas 26 in a card 22. In one suitable arrangement, this means may comprise a letter or a number or some other character indicator, one being provided for each column on the punch card 22 and positioned, for example, along the lower edge of card 50. Numerals 30*a*, 30*b*, 30*c*, etc. corresponding to the numeral designations of the master code cards are shown for this purpose. To use card 50 for read-back purposes, the operator merely draws the card to the left as seen in FIG. 4 by a small amount sufficient to align the columns of numerals on card 50 with the columns of scored areas and perforations on card 22. When this is done, the perforations in the punch card which have been removed can be identified by the numerals carried by card 50 which are thus visible through these perforations, and the desired read-back or monitoring is achieved.

In another arrangement, an indicator for identifying the pertinent master code card may be provided in the columns of numerals on card 50 or otherwise so that it can be viewed through perforations in card 22.

Figure 5:
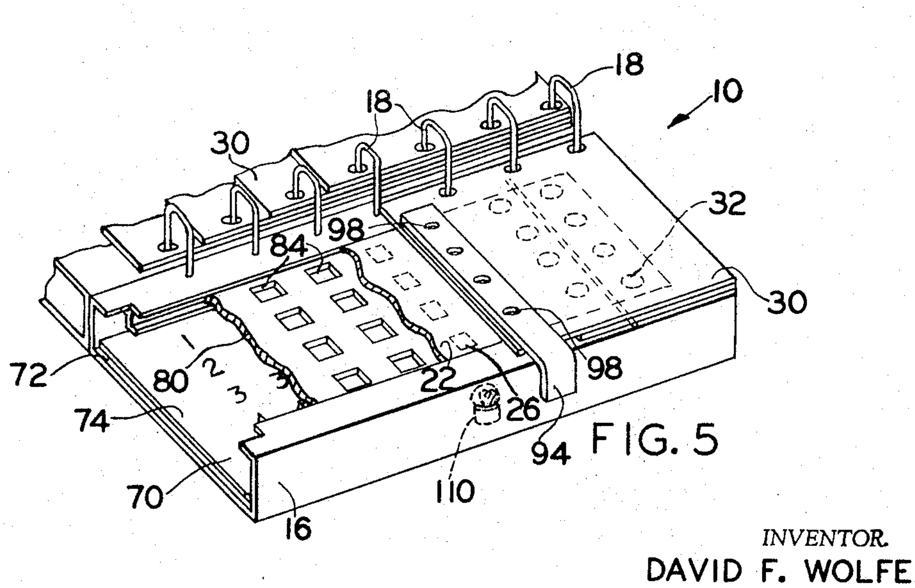
FIG. 5 is a perspective view of a portion of another modification of the invention.

The trays shown in FIG. 1 may be modified as shown in part in FIG. 5 to permit instant monitoring or read-back of information entered in a punch card. In this modification of the invention, it is assumed that the tray portion 16 is of sufficient depth to include a hidden chamber 70 having a base 72. On the base is supported a card 74 which carries a plurality of numerals which are aligned with the columns of numbered apertures in the master code cards. In this embodiment of the invention, the resilient sheet 20 of FIG. 1 is replaced by a rigid support plate 80 horizontally oriented and suitably supported above and spaced from the card 74 seated on the base of the chamber. Slots or support posts or the like may be provided in the side walls of the tray portion 16 to support the rigid plate. The plate 80 includes a plurality of columns of perforations 84 which are aligned with the columns of numerals on card 74 on the base. These perforations are sufficiently large so that numerals in the base card 74 may be viewed therethrough. The plate 80 supports a blank punch card 22 having its scored areas 26 aligned with the perforations in the support plate and the numerals in the base card. The punch card may also be held in guide slots or the like in the walls of the tray portion. A set of master code cards 30 is provided as above in the same operative relation with the punch card 22 as described above. In this embodiment of the invention, the master cards 30 include relatively large perforations 32 which permit the operator to read a number in the base card 74 by looking through the master card, through perforations in the punch card, and through apertures in the support plate. The apparatus also includes a movable or slidable template 94 which is adapted to be operated in conjunction with the master code cards and is somewhat wider than a column of perforations in the master cards. The template 94 includes a column of perforations 98 of smaller diameter than those in the master code card, and these perforations 98 serve to guide a stylus during a card punching operation. The template may be of metal, plastic, paper, or the like, and it may be operated by hand or it may include some means for securing it in place in alignment with a column of apertures in a master code card. For example, the ends may be resilient and may be adapted to grip the sides of tray 16. Alternatively, tray 16 may include notches in which one or both ends of the template may seat. If necessary, a light source 110 of any suitable type may be included in the chamber to facilitate the reading operation to be described.

In operation of this embodiment of the invention, all of the master code cards are disposed on the punch card with the shortest card on the bottom and the longest card on top. The template is positioned over the column of perforations in the top master card, and the desired information is entered in the blank punch card by inserting a stylus through the aligned perforations in the template and in the master code card. The same procedure is followed for the other master code cards by removing the template, turning back the master cards until the next desired one is on top, replacing the template, and entering the desired information in the punch card by perforating the punch card. It can be seen that, with the apparatus described, it is possible to read any column of apertures in the punch card at any time by merely looking through the perforations therein to read the corresponding aligned numbers in the base card 70.

The invention described above provides a relatively simple, compact, efficient apparatus for entering information in blank punch cards with optimum speed. The apparatus also permits read-back of information at will.

Those skilled in the art will appreciate the various modifications which may be made in the mechanical apparatus shown within the principles embodied in the apparatus.

What is claimed is:

1. Apparatus for entering information in punch cards including a support member, a blank punch card supported on said support member, said punch card having a plurality of areas arranged in a pattern and adapted to be selectively removed to represent the entry of information in the punch card, a plurality of master code cards each carrying information to be entered in said punch card, the information on each code card being represented by an array of perforations arranged in the same pattern as said areas in said punch card so that the perforations in each master card can be aligned with the corresponding array of areas in the punch card, each master card being adapted to be moved separately into and out of operative relation with the blank punch card, and an auxiliary card for use in re-reading information entered in a punch card, said auxiliary card including a plurality of columns of indicia corresponding to the columns of perforations in the master code cards, said auxiliary card being positioned beneath the punch card whereby indicia thereon may be read through apertures in the punch card.

2. The apparatus defined in claim 1 wherein said auxiliary card is slidably positioned beneath the punch card whereby it can be selectively positioned with respect to the punch card so that indicia thereon may be read through apertures in the punch card.

3. Apparatus for entering information in punch cards including a support member, a blank punch card supported on said support member, said punch card having a plurality of areas arranged in a pattern and adapted to be selectively removed to represent the entry of information in the punch card, a plurality of master code cards each carrying information to be entered in said punch card, the information on each code card being represented by an array of perforations arranged in the same pattern as said areas in said punch card so that the perforations in each master card can be aligned with the corresponding array of areas in the punch card, each master card being adapted to be moved separately into and out of operative relation with the blank punch card, and an auxiliary indicator means disposed beneath said punch card and including columns of characters corresponding to the columns on said master code cards and aligned with the columns of scored areas and perforations in said punch card whereby a perforation in the punch card may be identified by the character in said auxiliary means which is visible through it.

References Cited

UNITED STATES PATENTS

| | | | |
|---|---|---|---|
| 1,644,160 | 8/1926 | Thompson | 35—48 |
| 1,928,565 | 3/1932 | Kindig | 35—48 |
| 2,392,488 | 1/1946 | Maccallum | 346—104 |
| 2,503,130 | 8/1946 | Poritz | 35—48 |
| 3,102,038 | 8/1965 | Harris | 346—104 |
| 3,240,409 | 3/1966 | Harris | 235—50 |

RICHARD B. WILKINSON, *Primary Examiner.*

M. LORCH, *Assistant Examiner.*